United States Patent [19]

Vadekar

[11] 4,248,705

[45] Feb. 3, 1981

[54] PROCESS FOR REMOVING OIL FROM OILY WASTE WATER STREAMS

[75] Inventor: Mohan Vadekar, Florham Park, N.J.

[73] Assignee: Exxon Research & Engineering Co., Florham Park, N.J.

[21] Appl. No.: 794,046

[22] Filed: May 5, 1977

[51] Int. Cl.³ .............................................. C02F 1/28
[52] U.S. Cl. ................................... 210/680; 210/924; 210/693
[58] Field of Search .............. 210/23 R, 36, 40, 73 W, 210/242 AS, 502, 503, 505, DIG. 5, DIG. 26

[56] References Cited

U.S. PATENT DOCUMENTS

| | | | |
|---|---|---|---|
| 3,562,153 | 2/1971 | Tully et al. | 210/36 |
| 3,800,945 | 4/1974 | Fowler | 210/505 |
| 3,862,963 | 1/1975 | Hoshi et al. | 210/502 |
| 4,008,160 | 2/1977 | Vadekar et al. | 210/23 R |

*Primary Examiner*—Ivars C. Cintins
*Attorney, Agent, or Firm*—Edward M. Corcoran

[57] ABSTRACT

An improved process for removing oil from oily waste water streams, particularly from aqueous refinery streams wherein the oil is present as a stable oil-in-water emulsion, which comprises passing the stream through a filter bed of particulate, unprocessed PVC or its copolymers mixed with a granular, inert and preferably porous filler material such as particles of coke or carbon. The improvement substantially increases bed life and has unexpectedly resulted in higher oil-absorption capacity of the filter bed.

14 Claims, No Drawings

PROCESS FOR REMOVING OIL FROM OILY WASTE WATER STREAMS

BACKGROUND OF THE INVENTION

1. Field of the Invention

This invention relates to an improved process for removing oils from oily waste water streams. More particularly, this invention relates to an improved process for removing oil from aqueous refinery streams wherein the oil is present in the stream both as free oil and as an oil-in-water emulsion and is removed from the water by passing the stream through a particulate filter bed of vinyl chloride containing polymers mixed with particles of an inert material. Still more particularly, this invention relates to an improvement in the removal of oil from oily refinery streams wherein the oil is present as a relatively stable oil-in-water emulsion and wherein said streams may be sour water from a steam cracker or spent caustic from steam cracker treating towers which comprises filtering the stream through a filter bed of unprocessed particles of PVC homopolymer or copolymers thereof, the improvement comprising one or more granular, inert filter materials intimately mixed with the polymeric particles in the filter bed.

2. Description of the Prior Art

U.S. Pat. No. 4,008,160, the disclosures of which are incorporated herein by reference, teaches a process for removing oil from oily water streams comprising passing the oily water through a filter bed of granular, unprocessed vinyl chloride containing homopolymers and copolymers. Both free oil and emulsified oil are removed from the water by this process. The oil is actually absorbed by and into the polymeric filter media. This is especially useful for removing oil from the sour water effluent of steam cracker primary fractionator tower overheads, which contain highly olefinic, emulsified and free oil, as well as spent caustic from steam cracked liquid and vapor treating towers which also contains highly reactive, olefinic, polymerizable oil as a stable oil-in-water emulsion.

During commercial use of this process, it was observed that absorption of the oil by and into the polymeric filter media ultimately resulted in softening and swelling of the discrete polymer particles. The soft, expanded, oil-plasticized polymer particles fused to each other resulting in an excessive pressure drop and finally plugging of the filter bed. This occurred at the upstream end of the filter, thereby requiring frequent shutdowns and replacement of the filter media. Further, because the plugging occurred at the upstream end of the filter, replacing the filter media resulted in losing the oil absorption capacity of the polymer particles at the downstream end. Therefore, an improvement to the process was desirable.

SUMMARY OF THE INVENTION

An improvement has now been found in a process for removing both free oil and emulsified oil from oily water streams comprising passing the oily water stream through a bed of one or more unprocessed, granular, vinyl chloride-containing polymeric compounds wherein the improvement comprises granular, inert filler material mixed with the polymeric compounds in the bed, thereby substantially reducing the pressure drop across the bed and greatly increasing its useful life. Further, this invention has been found to result in an unexpected increase in the oil absorption capacity of the polymeric filter material.

The granular, inert filler which is mixed with the polymer may be any solid, particulate material unaffected by the oily stream. Thus, it may be an inert plastic such as particles or shavings of polyethylene, polypropylene, poly(vinyl fluoride) such as Teflon, phenol formaldehyde such as Bakelite and the like. Thermoplastic materials are further restricted in that the softening point of the plastic must be higher than the temperature of the oily stream. Inorganic materials not affected by the oily water are also useful, suitable examples including particles of alumina, clay, crushed gravel, sand, ceramic, etc. Porous inorganic materials are preferred. It has been found that the improvement of this invention increases with increasing porosity of the filler. Particularly preferred fillers are porous materials such as charcoal, coke breeze and the like.

The particle size of the filler material is important in that if it is too small it will result in too great a pressure drop across the filter bed, thereby defeating the improvement of this invention. On the other hand, if the particle size of the filler is too large the filter bed will contain voids which will result in inefficient contact between the oily water stream and polymeric filter material. From a practical point of view, it is advantageous for the particle size of the filler to be about the same size as that of the polymeric filter material. An illustrative but non-limiting example is about 5–50 mesh. Finally, the polymer/filler volume ratio is important in that too high a ratio will produce results similar to that in which no filler is present, while too low a ratio will reduce the oil absorption capacity of the filter bed below a practical value. Therefore, it is preferable for the polymer/filler volume ratio to be within the range of from about 2/1 to ½.

The polymeric filtration media must comprise unprocessed particles of a vinyl chloride containing compound or compounds. That is, the polymer or polymers must contain carbon-chlorine bonds in an amount equivalent to that which would exist if the polymer were polymerized from monomers comprising at least 50 mole percent vinyl chloride monomer. By the word unprocessed, it is meant that the compound or resin must not be processed chemically, thermally or with solvents after being polymerized, because it has been found that further processing, such as pelletizing, casting or plasticizing of the raw, unplasticized vinyl chloride-containing compounds, greatly reduces their effectiveness as filtration media useful in the process of the instant invention. The vinyl chloride-containing polymer particles may comprise homopolymeric polyvinyl chloride or they may be copolymers of vinyl chloride with a second vinyl-type monomer or mixtures of polyvinyl chloride homopolymers and/or copolymers. For example, they may comprise polymers containing vinylidene chloride, such as Saran. As hereinbefore stated supra, the polymers or copolymers should contain at least 50 mole percent vinyl chloride (or equivalent in carbon-chlorine bonds) and preferably at least 70% vinyl chloride. Illustrative but non-limiting examples of such copolymers are copolymers of vinyl chloride and vinyl acetate, vinyl chloride and propylene, vinyl chloride and vinyl ethers, vinyl chloride and polymers of acrylic or methacrylic acids, vinyl chloride and alkyl esters of maleic acid, vinyl chloride and vinyl acetate, etc. Alternatively, the copolymers may contain substantially more carbon-chlorine bonds than a homopolymer of polyvinyl chloride. An illustrative but non-limiting example of the latter is Saran, which is a copolymer of vinyl chloride and vinylidene chloride, and which may contain up to as much as 50 percent vinylidene chloride. These polymers or copolymers may be produced by any of the well known methods such as emulsion polymerization, suspension polymerization, bulk and solution polymerization.

As is the case for the invention disclosed in U.S. Pat. No. 4,008,160, it is also an essential feature of this invention that the vinyl chloride containing polymer or copolymer filtration media must not receive additional thermal, chemical or solvent treatment after the polymerization reaction other than the normal washing, drying, clarification, crushing, bagging, etc., operations necessary to produce a usable, porous, dry, granular polymeric product. It has been found that any additional thermal, solvent and/or chemical processing of these polymeric materials such as extruding, pelletizing, casting, plasticizing, etc., greatly reduces their inherent porosity and hence their effectiveness as a filtration medium for removing the olefinic, emulsified oil from the oily water streams of this invention. It has also been found that an essential feature of this invention lies in the ability of the polymeric compounds to be plasticized by, or at least capable of being plasticized by, the relatively olefinic, polymerizable oily species present in the oil-in-water emulsion. That is to say, the mechanism of the instant invention is believed to be a physio-chemical process wherein the oily species in the emulsion is adsorbed by, and then absorbed into, the polymeric filtration medium.

Almost any particle size or particle size distribution of the polymeric filter material will work, but it has been found that for practical purposes such as efficiency and absorptive capacity expressed as volume of oil absorbed per volume of bed per volume of oily water passed through per unit of time, pressure drop, etc., a preferred particle size distribution comprises coarse particles ranging from about 100 to about 8,000 microns in diameter, more preferably from about 250 to about 7,000 microns in diameter, and most preferably from about 400 to 5,000 microns in diameter. Most commercially available polyvinyl chloride polymers and copolymers are of a finer particle size ranging from about 75 to about 250 microns in diameter. However, a commercially available polymer which has been found to work in this invention is Marvinol 2001, a PVC homopolymer with a controlled particle size distribution in the 250 to 4,000 micron range, available from Uniroyal Chemical.

The free oil may be saturated or unsaturated. If it is saturated, then it is removed from the water primarily by physical adsorption onto the surface of the polymer. The emulsified oil preferably comprises a relatively olefinic, reactive, polymerizable species. This species is actually absorbed by and plasticizes the vinyl chloride containing polymeric filter material. Illustrative, but non-limiting examples of oily water streams suitable for use in the instant invention comprise sour water from steam cracker primary fractionator tower overheads and spent caustic from steam cracked liquid and vapor treating towers, both of which contain appreciable amounts of highly olefinic, polymerizable oil in the form of a relatively tight or stable oil-in-water emulsion. Spent caustic streams from the treating of hydrocarbon gases and liquids from steam crackers usually contain from about 300 to about 10,000 or more ppm of highly reactive, polymerizable, unsaturated olefinic and (often conjugated) diolefinic, sulfur containing oily components. These oils are relatively polar and, therefore, remain in emulsion in the aqueous phase. Sour water from steam crackers contains similar oils. Upon standing for extended periods of time, these oils slowly polymerize to higher molecular weight products. It should be noted that about 5–10 wt. percent of the total oil present in spent caustic from steam cracked liquid vapor treating towers will be free oil while as much as about 30–40 wt. percent of the total oil present in spent caustic from steam crackers may be free oil.

DESCRIPTION OF PREFERRED EMBODIMENTS

This invention will be more apparent from preferred embodiments which are illustrated by the following examples.

EXAMPLE 1

In this experiment, spent caustic from a steam cracked liquid treating tower containing 0.2–0.3 wt. percent of oil, 90 wt. percent of said oil being highly olefinic, emulsified oil and 10 wt. percent of which was free oil was pumped through a vertical downflow filter packed with a raw, unprocessed, coarse grain (2–60 mesh) suspension polymerized PVC resin filter resin. The flow rate of the oily water through the filter bed was about 4 bbls/hr or about 2.8 gpm. During two of the runs, the filter contained only the PVC resin. For the remaining four runs, the filter bed consisted of PVC resin mixed with either coke breeze or charcoal inert filler material.

The end of a run was determined by too high a pressure drop and plugging of the filter bed for the case of a filter bed containing PVC resin alone. Oil breakthrough in the filtered water product determined the end of the runs when the filter bed comprised PVC resin mixed with inert filler material. At the end of each run samples of PVC resin were taken from the top and bottom of the filter bed and the oil content thereof determined by extraction with chloroform. In the case of those runs wherein the filter bed comprised PVC mixed with the charcoal, samples of the charcoal were also obtained from the filter bed and the oil content thereof determined in a similar manner. It was found that the charcoal itself did not absorb any more than 10 percent of its own weight of oil.

The results of this experiment are contained in Table 1 and illustrate the improvement of the instant invention in greatly increasing the active life of the filter bed as well as unexpectedly resulting in an increase of the absorptive capacity or oil loading ability of the PVC resin when used in accordance with this invention. It was completely unexpected to find that the instant invention resulted in a substantially higher oil absorbing capacity for the PVC resin in the filter bed (which had heretofore been found to be about 1.1 pounds of oil per pound of PVC resin).

EXAMPLE 2

This experiment was similar to that of Example 1. The same PVC resin and oily water feed was used. Two parallel filter beds were employed. In one run 125 pounds of PVC resin alone were charged to each filter. In the second run, each filter was charged with 125 pounds of PVC resin and 160 pounds of Pittsburgh (PPG) activated charcoal (20–40 mesh). In both cases the oily water feed rate was 7–10 bbls/hr. After six days the first run had to be stopped due to plugging up of the filter beds. However, the second run wherein the filters contained a mixture of PVC and charcoal ran for 30 days before oil came through the filter with the sour water product.

TABLE 1

OIL REMOVAL FROM STEAM CRACKER SPENT CAUSTIC

| Run | Filter Contents, Lb. PVC | Filter | Run Length, Days | Pressure Drop Across Filter, psi SOR[a] | EOR[a] | Oil Absorption by PVC in Filter, lb oil/lb PVC Top | Bottom |
|---|---|---|---|---|---|---|---|
| 1 | 300 | — | 7 | 3–4 | 40 | 1.0 | <0.2 |
| 2 | 300 | — | 5 | 5 | 50 | 1.1 | 0.25 |
| 3 | 200 | 100 (coke breeze) | 18 | 3 | 10 | 1.1 | 1.5 |
| 4 | 200 | 100 (charcoal) | 19 | 4 | 8 | 1.5 | 1.2 |
| 5 | 150 | 150 (?) | 20 | 2 | 8 | 1.5 | 1.5 |
| 6 | 125 | 180 (?) | 28 | 2 | 6 | 1.9 | 1.8 |

Notes:
[a]SOR - start of run.
EOR - end of run.

What is claimed is:

1. In a process for removing free and emulsified oil from oily water streams wherein at least a portion of said emulsified oil is a relatively olefinic, reactive, polymerizable species comprising passing the oily water stream through a bed of one or more unprocessed, granular vinyl chloride-containing polymeric compounds which compounds contain at least 50 mole percent of vinyl chloride or its equivalent in carbon-chlorine bonds, the improvement which comprises granular, inert filler material mixed with said polymeric vinyl chloride-containing polymeric compounds in the bed, thereby substantially reducing the pressure drop across the bed and greatly increasing its useful life.

2. The process of claim 1 wherein the particle size distribution of the vinyl chloride-containing polymeric compound ranges from about 100 to about 8,000 microns.

3. The process of claim 2 wherein the particle size distribution of the inert filler material ranges from about 5 mesh to about 50 mesh.

4. The process of claim 3 wherein the vinyl chloride-containing polymeric compound comprises at least one resin selected from the group consisting of polyvinyl chloride, polyvinyl chloride-polyvinylidene chloride copolymers, polyvinyl chloride-polyvinyl acetate copolymers, polyvinyl chloride-polyethylene copolymers and mixture thereof.

5. The process of claim 4 wherein the volume ratio of said vinyl chloride-containing polymeric compounds to said filler material ranges from between about 2/1 to ½.

6. The process of claim 5 wherein said inert filler material is selected from the group consisting of charcoal, activated carbon, coke breeze, crushed gravel and mixture thereof.

7. The process of claim 6 wherein said inert filler material is porous.

8. The process of claim 6 wherein the oily water stream comprises spent caustic from steam cracked liquid and vapor treating towers.

9. The process of claim 6 wherein said oily water stream comprises sour water from steam cracker primary fractionator overheads.

10. The process of claim 6 wherein said inert filler material is coke breeze or carbon.

11. In a process for removing emulsified oil from oil-contaminated aqueous refinery streams wherein at least a portion of said oil is a reactive, olefinic, polymerizable hydrocarbon which process comprises passing said streams over a filter bed containing at least one unprocessed, granular, polyvinyl chloride homopolymer having a particle size ranging from 100 to 8,000 microns in diameter, the improvement which comprises granular, inert filler material mixed with said polyvinyl chloride homopolymer in said filter bed, said filler material having a particle size ranging from about 5 mesh to 40 mesh, thereby substantially increasing the useful life of said filter bed.

12. The process of claim 11 wherein the volume ratio of said polyvinyl chloride homopolymer to said inert filler material ranges from 2/1 to ½.

13. The process of claim 12 wherein said inert filler material is selected from the group consisting of charcoal, activated carbon, coke breeze, crushed gravel and mixtures thereof.

14. The process of claim 12 wherein said inert filler material is porous in nature.

* * * * *